July 12, 1960 J. H. WILSON 2,944,756
RESILIENT FACINGS FOR DRUM FLANGES
Filed July 31, 1956 2 Sheets-Sheet 1

INVENTOR.
JohnHart Wilson
BY
Watson, Cole, Grindle & Watson,
attys.

July 12, 1960  J. H. WILSON  2,944,756
RESILIENT FACINGS FOR DRUM FLANGES
Filed July 31, 1956  2 Sheets-Sheet 2
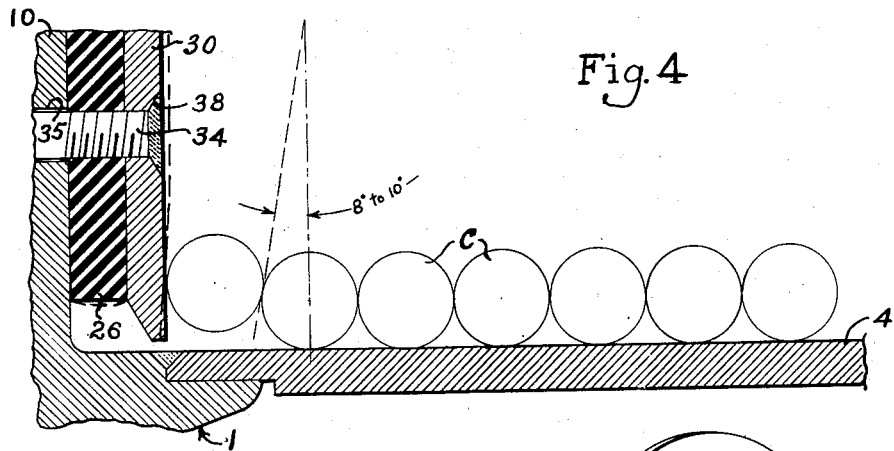
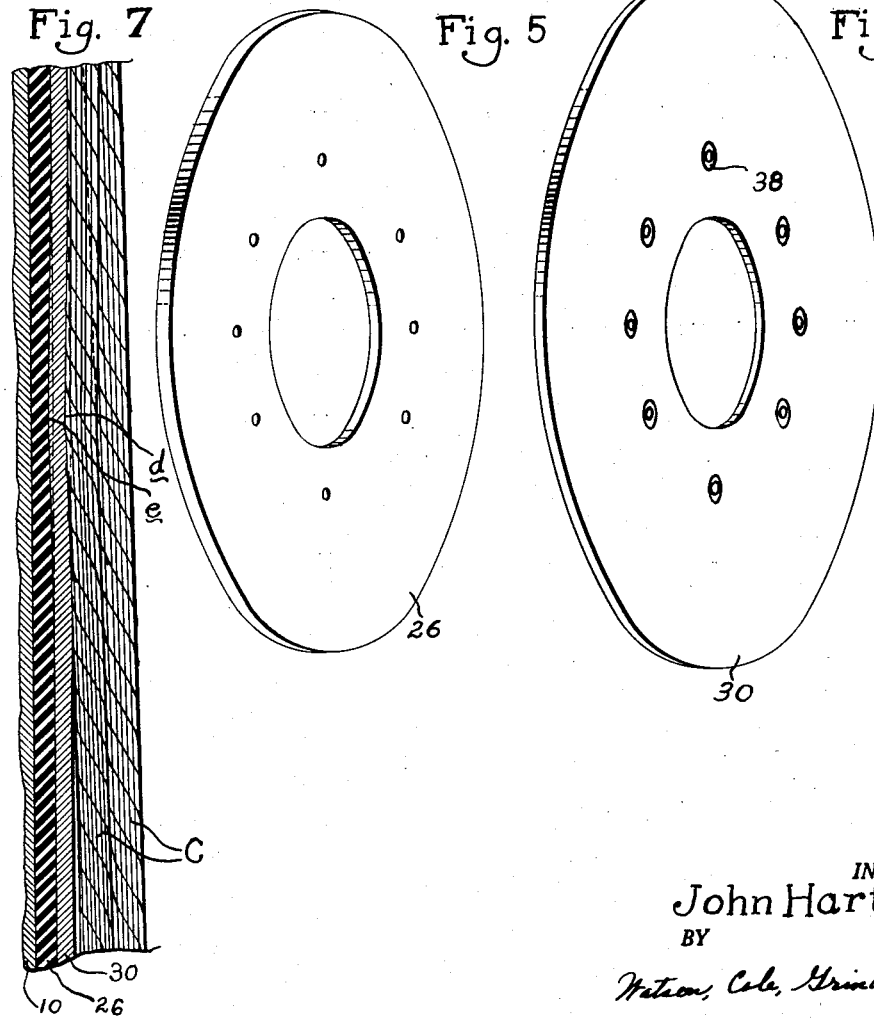
INVENTOR.
John Hart Wilson

United States Patent Office 2,944,756
Patented July 12, 1960

2,944,756
RESILIENT FACINGS FOR DRUM FLANGES

John Hart Wilson, P.O. Box 329, Wichita Falls, Tex.

Filed July 31, 1956, Ser. No. 601,300

8 Claims. (Cl. 242—117)

This invention relates to winding drums upon which long lengths of cable are wound, such as the cable used in swabbing oil wells, for use on drilling rigs, and the like, and more particularly to the yieldable facing members on the flanges of the winding drum.

Various winding drums have been proposed heretofore, wherein the cable was wound, layer upon layer, until the drum was spooled with cable substantially to the outer diameter of the drum flanges, and in so doing, the last turn of each layer of cable would wedgingly engage between the next to last turn of cable and the drum flange, in such manner as to exert a terrific wedging action, which had a tendency to break the drum flange away from the drum barrel, or to deform the drum flange outward. When this was repeated a number of times, and it was repeated on the same drum flange on every other layer, the total force exerted on the drum flange became so great that the drum flange often deformed or the drum barrel stretched in length so that one or both had to be replaced, or it could have been necessary to replace the entire drum assembly.

In the present invention, a resilient, annular disc of elastomer material is used as a facing for each inner face of the drum flanges, with a slightly deformable wear plate fitted over resilient disc elements of elastomer material, so as to make possible localized yielding of the wear plates, without undue strain on the inner face of the drum flanges.

An object of this invention is to provide a resilient, rubber-like, elastomer material on the inner face of one or both drum flanges, so as to enable localized yielding of the resilent member on the drum flange without causing undue stress and strain on the flanges of the winding drum.

Another object of the invention is to provide a resilient elastomer drum flange facing for lining the inner face of the respective flanges of the winding drum, to each of which a wear plate is secured so that the life of the resilient, rubber-like members will be prolonged.

With these objects in mind, and others which will become manifest as the description proceeds, reference is to be had to the accompanying drawings, in which like reference characters designate like parts in the several views thereof, in which:

Fig. 4 is an enlarged, fragmentary view of a portion of a drum barrel and drum end, showing cable wound thereon;

Fig. 5 is a perspective view of the annular, elastomer ring;

Fig. 6 is a perspective view of the annular wear plate; and

Fig. 7 is a flat, roll-out, plan view of a portion of the drum, having a drum flange, a resilient member and a wear plate thereon, and showing an exaggerated relation of the cable, wear plate and resilient member, so as to bring out the functional relationship between the cable, the resilient member and the drum flange.

Figure 1:
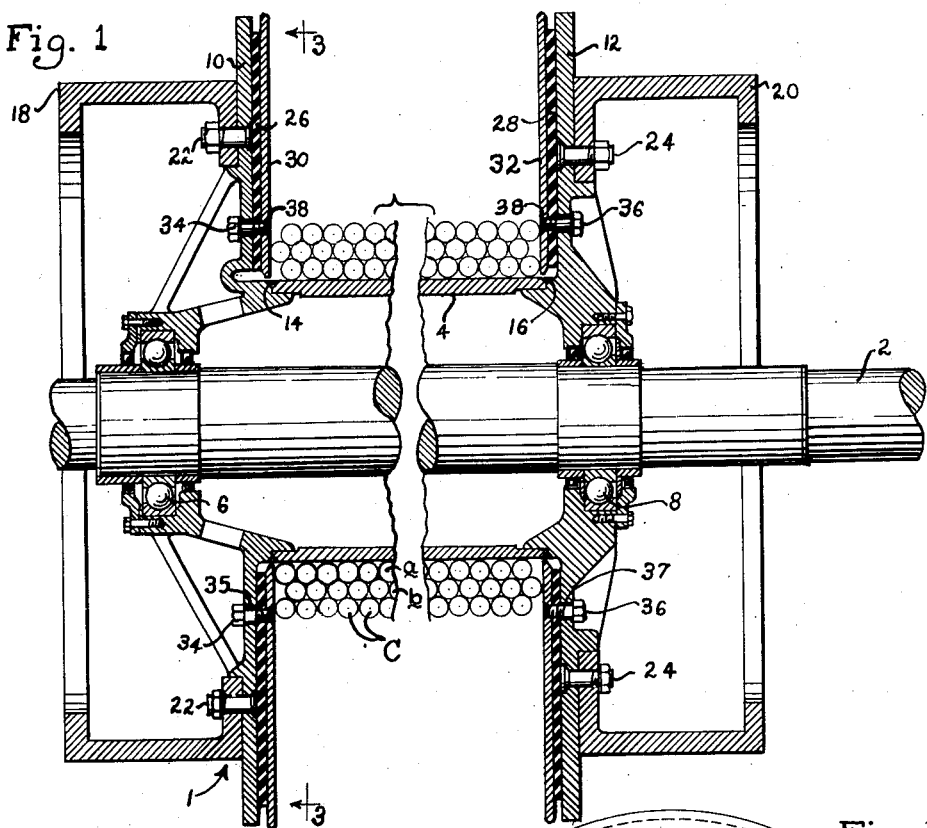
Fig. 1 is a longitudinal sectional view through a winding drum, with parts thereof broken away and shortened to show the details of construction, and showing the device embodying the invention installed thereon.
Figure 2:
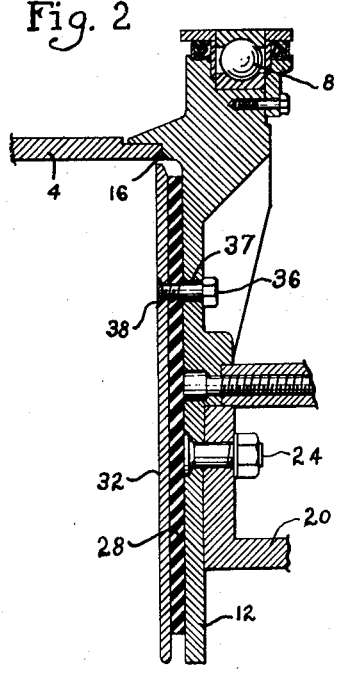
Fig. 2 is an enlarged, fragmentary, detail, sectional view through a portion of the drum flange, showing the manner of attaching the resilient, elastomer, annular drum flange facing, and the annular wear plate associated therewith.

With more detailed reference to the drawing, the numeral 1 designates generally the drum, having a drum shaft 2 on which the drum assembly is mounted. The drum assembly comprises the drum barrel 4 having flanges 10 and 12 secured to the respective ends thereof, as by welding, as indicated at 14 and 16. The drum assembly is mounted on bearings 6 and 8. Each of the drum flanges 10 and 12 may have a brake ring, 18 and 20 respectively, secured thereto, as by bolts 22 and 24, which bolts are the counter-sunk head type, as will best be seen in Fig. 1.

Resilient, annular rings of elastomer material, which rings are designated at 26 and 28, are provided to fit around the drum barrel 4 at each end thereof adjacent the inner face of the respective drum flanges 10 and 12. Each of the annular, elastomer rings 26 and 28 has an annular wear plate ring 30 and 32 fitted in adjacent relation with respect thereto, and the elastomer rings and the wear plates are secured to the respective drum flanges 10 and 12 by means of cap screws 34 and 36, which pass loosely through the respective drum flanges 10 and 12, and through holes in the respective annular, resilient, elastomer rings 26 and 28 and their respective wear plates 30 and 32.

The holes in the respective wear plates 30 and 32 are screw threaded so that the respective cap screws 34 and 36 will screw thereinto. The inner face of the respective wear plates is chamfered around the respective holes therein to enable the welding thereof, as indicated at 38. The bolts 34 and 36 are slidably fitted in the respective drum flanges 10 and 12, so, upon compressing the elastomer material, of the annular rings 26 and 28, the bolts 34 and 36 will yield, but these bolts will move back into normal position when the pressure is released from the respective wear plates.

Figure 3:
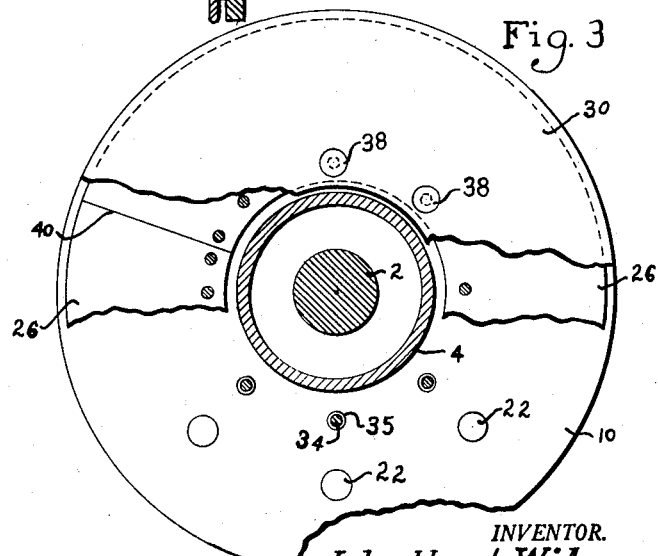
Fig. 3 is a sectional view taken on the line 3—3 of Fig. 1, looking in the direction indicated by the arrows, with parts broken away and shown in elevation, to bring out the details of construction.

The respective annular, elastomer rings 26 and 28 may be split along a radial line, as indicated at 40, in Fig. 3, so, upon removal of the bolts 34 and 36, a new annular elastomer ring may be deformed so as to pass the slitted portion 40 over the drum barrel 4, after which the wear plates are moved back into position, and the respective bolts 34 and 36 fitted within the respective holes. After the bolts have been bolted in place, the ends thereof may be welded to the respective wear plates, as hereinbefore set out.

Operation

When the cable C spools onto the barrel 4 of the winding drum 1, in a spiral, or a combination of straight and spiral turns, the end turn on each layer comes into wedging contact with the drum flange 10 or 12, if the resilient member and the wear plate is not used, or with the wear plate, which may be on the faces of the flanges, if a wear plate is used. The cable C wedges between the next to the last turn of the cable on the drum and the drum flange, until the force of the wedging action is sufficient to raise the cable C to the level of the next layer on the drum, then the cable winds across the drum to the opposite side, and again comes into contact with the drum flange, until it exerts sufficient force to raise it up to the next layer, and this repeats until all the cable is wound, that is to be used, or the drum is full. The wedging action of the cable upon the drum creates a tremendous force which, by experience and calculation, is estimated to be in the order of ten times the amount of pull on the cable. Since drums used for winding cable which pulls swabs from oil wells, are usually about 9/16 of an inch in diameter, and often pulls a load in excess of 10,000 pounds, the force exerted by the wedging action of the cable upon the drum flange, may therefore, be in the order of 100,000 pounds for each wedging contact between the cable and the drum flange. Since there is usually as many as twenty-eight layers of the cable, and the force is exerted on the same drum flange every other layer, which means that fourteen layers are pressing against each drum flange and each layer may press against the drum flange with a force in the order of 100,000 pounds, which means that the pressure on each drum flange has a total force pressing against it, somewhere in the order of 1,400,000 pounds. This force is so great that it causes the drum flanges to be distorted, usually assuming a flat conical shape spread at the outside, or the drum barrel may be stretched, which drum barrel is usually of very heavy alloy steel, or the pressure may create other damage.

Many attempts have been made to overcome this destructive force, but so far, such attempts have been directed chiefly to strengthening the drum flanges, in the hope of being able to resist the forces of the pressure, but as strong as the drum flanges and the drum barrel can be made, within practical weight limits, it has heretofore been impossible to make a drum which will withstand these tremendous forces.

The present invention contemplates the use of a resilient, rubber-like material, 26 or 28, to face the inner surfaces of the drum flanges, with a steel, or other suitable material, wear plate, 30 or 32, covering the resilient rubber-like facing, and with which wear plates the cable comes in contact when it wedges against the drum flanges. When the cable comes in contact with a wear plate, it pushes back on the wear plate at the localized point of contact, to compress the rubber-like material, but there is no great transfer of force to the drum flange itself, at this localized point.

However, since the wear plate distorts, to a certain extent, the wedging angle increases, as shown exaggerated in Figs. 4 and 7, and the cable raises up onto the next layer with considerably less force against the drum flange, than would be the case if the drum flange were of non-resilient material, such as steel, which is commonly used for drum flanges. Therefore, by the use of this type of construction, it is possible to make a drum which is much lighter in weight, but which will withstand the wedging force of the cable when it goes up to the next layer. The device, as described above, has now been tested over a number of months, and so far, not one drum, so equipped, has spread, although the same operator may have previously spread three or four drums, which were not constructed in accordance with the method herein set out.

Figs. 4 and 7 show a small detail of the cable wedging between the drum flange and the last turn of the cable, and, as can be seen, the angle between the last turn and the drum flange is a relatively small angle, when the line tends to lift. With a non-resilient drum flange, the angle indicated would be approximately 8 to 10 degrees, this being approximately the angle of friction of the cable with an oily surface thereon.

With drums, as used heretofore, extremely heavy bracing was used, but even with this precaution, the flanges were invariably deformed, and required periodic replacement, either of the drum flanges or of the entire drum assembly.

With the present annular facings 26 and 28, of resilient, elastomer material on the inner faces of the drum flanges, and with the annular wear plates 30 and 32 secured in place by means of bolts 34 and 36, respectively, the wear plates will yield for the particular distance on which the pressure is being applied, and the elastomer ring will deform to absorb the push exerted on the wear plates, and the angle between the cable and the wear plate will increase rather abruptly, and the cable will climb to the next layer with far less pressure on the drum flange, than would be exerted on a rigid drum flange. The bolts 34 and 36 will slide in their holes 35 and 37 at the particular point at which pressure is applied, if the pressure is applied near the bolt.

The dashed outline in Figs. 4 and 7 indicates how the wear plate 30 will yield to pressure and compress the annular, elastomer ring 26, when the cable C wedgingly engages between the last convolution of the cable and the wear plate. The deformation of the wear plate is for a short distance, as will best be seen in Fig. 7, at $d$, so as to compress the elastomer element 26 at $e$. Whereupon, the angle between the wear plate and the adjacent convolution of the cable increases more abruptly, thereby enabling the cable C to climb up to the next layer on the drum, without exerting great strain on the drum ends.

While the invention has been shown and described in some detail, in one embodiment thereof, it is to be understood that changes may be made in the minor details of construction and adaptations made to different installations, without departing from the spirit of the invention or the scope of the appended claims.

Having thus described the invention, what is claimed is:

1. A winding drum assembly comprising two drum flanges, a drum barrel secured between said drum flanges, at least one disc-like resilient element encircling said drum barrel at an end thereof, and having a radial surface in abutting relation to the inner face of at least one of said drum flanges, at least one disc-like metal annulus encircling said drum barrel substantially parallel to said drum flange and in abutting relation to the opposite surface of said resilient element, and means securing said metal annulus and resilient element in assembled relationship to said flange.

2. A winding drum assembly as defined in claim 1, including a resilient element encircling the drum barrel at each end thereof, in abutting relation to the inner face of a drum flange, and a metal annulus encircling the drum barrel in abutting relation to each said resilient element.

3. A winding drum assembly as defined in claim 1, said resilient element comprising an elastomer annulus.

4. A winding drum assembly as defined in claim 1, said securing means being movable relative to said drum flange to permit said metal annulus to move toward said flange upon compression of said resilient element.

5. A winding drum assembly as defined in claim 1, said metal annulus being deformable toward said resilient element in response to local pressures exerted thereupon, to effect local compression of said resilient element.

6. A winding drum assembly as defined in claim 1, said metal annulus extending outwardly beyond the periphery of said resilient element.

7. A winding drum assembly as defined in claim 1, said resilient element comprising an elastomer annulus having at least one transverse slit extending between its inner and outer peripheries.

8. An elongated winding drum assembly comprising two drum flanges having substantially parallel inner faces, a drum barrel of substantially less diameter than said drum flanges, said drum barrel being secured between said drum flanges, said drum barrel being of a length to define an elongated, cable winding space between said drum flanges, at least one substantially annular, disc-like resilient element surrounding said drum barrel and being of a size to cover the greater portion of the inner face of one of said drum flanges and being in abutting relation therewith, at least one metal, annular, disc-like element surrounding said drum barrel and being of a size to cover the greater portion of the inner face of said one of said drum flanges and being in abutting relation with said annular, disc-like, resilient element surrounding said drum barrel, the other of said drum flanges and said annular, disc-like metal element being spaced apart to receive therebetween multiple convolutions of cable on said drum barrel in side by side relation and to receive therebetween multiple layers of convolutions of cable on said drum barrel, and means securing said annular, metal, disc-like element and said annular, resilient, disc-like element in assembled relation to said one drum flange.

References Cited in the file of this patent

UNITED STATES PATENTS 1,894,432   Watson _____ Jan. 17, 1933